June 26, 1962
J. A. RICHARDS
3,040,469
MINNOW PAIL WATER CHANGER
Filed May 9, 1960
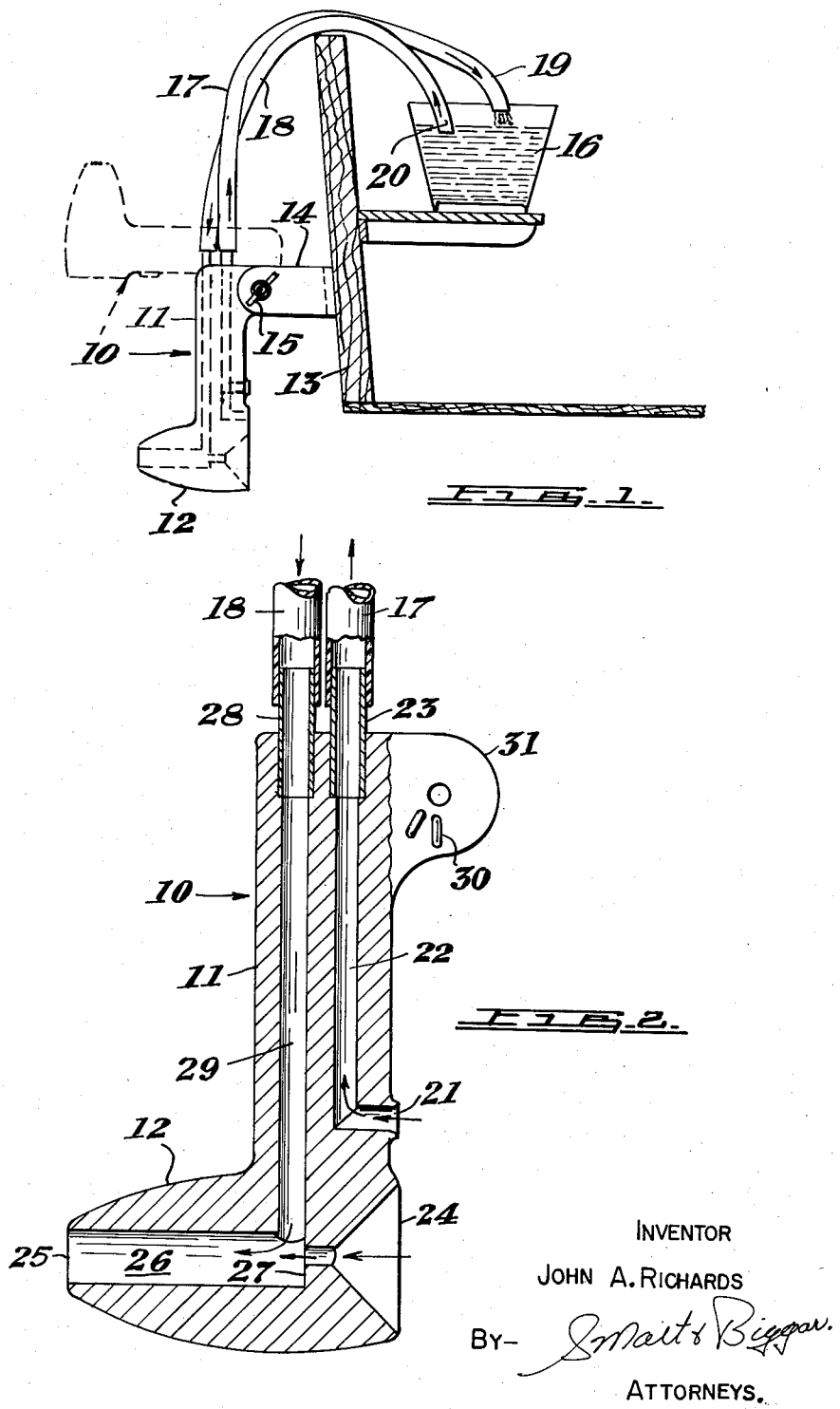
INVENTOR
JOHN A. RICHARDS
BY- *Smart & Biggar*
ATTORNEYS.

United States Patent Office 3,040,469
Patented June 26, 1962

3,040,469
MINNOW PAIL WATER CHANGER
John A. Richards, Port Lambton, Ontario, Canada
Filed May 9, 1960, Ser. No. 27,808
Claims priority, application Canada May 15, 1959
1 Claim. (Cl. 43—56)

The present invention relates a device for changing the water in a minnow pail in a boat while the boat is in motion.

In sport fishing it is common to carry a supply of minnows in a pail in the boat. The water in this pail can become stagnant and the oxygen consumed if the water in the pail is not changed regularly. Prior to the present invention, in order to change the water in some minnow pails it was necessary to have some sort of screen to retain the minnows in the pail while the pail was lifted over the side of the boat and placed in the water. One known type of minnow pail which has been devised consists of an inner and an outer pail, the inner pail being perforated and provided with a separate handle and cover. In order to change the water in the minnow pail the perforated inner container in which the minnows are kept is lifted from the outer pail and the water drained therefrom, the outer pail can then be emptied and refilled with fresh water. During this time the minnows are of course out of water and are subject to damage. It is not normally practical to change the water in this type of minnow pail when the boat is moving since it is necessary to lean over the side of the boat in order to empty and refill the outer pail.

It is an object of the present invention to provide an apparatus which continuously changes the water in the pail while the boat is in motion. No attention to the apparatus is required as this operation takes place automatically as the boat moves. According to the present invention the apparatus for supplying water to a minnow pail and for removing water therefrom comprises a body adapted to be mounted on a boat and having a first frontal opening, a second frontal opening, a rear outlet, a first connection for supplying water to a minnow pail and a second connection for removing water from a minnow pail. The first frontal opening is connected to the first connection by a first passageway. The second frontal opening has a large mouth, and is connected to the rear outlet by a second passageway having a constriction therein. The second connection is connected to the second passageway at the side of the constriction adjacent the rear outlet. Motion of the boat through the water causes flow into the fronttal openings and positive water pressure is supplied to the first connection and a partial vacuum is created at the second connection.

According to a feature of the invention this apparatus may be mounted on the boat in such a manner that it may be moved from its operating position to an inoperative position to prevent the change of water in the pail during motion of the boat. A further feature of the invention resides in making the body of the apparatus with an elongated upper portion and a bulbous lower portion, the body being provided with mounting means at the upper end thereof, the first frontal opening being in the elongated portion of the body, the second frontal opening and the rear outlet being in the bulbous portion of the body, the first and second connections being at the top of the elongated portion and the exterior surface of the body being shaped to reduce the drag of said body through the water.

A pair of tubes are connected between the body of the apparatus and the minnow pail. The end of the tube from the first connection of the body is terminated in the minnow pail above the end of the tube from the second termination. Thus as the boat moves through the water, water is forced in the first frontal opening and up through the tube into the minnow pail and simultaneously water is drawn from the minnow pail via the arrangement comprising the second frontal opening and the rear outlet. This apparatus requires no attention in operation and no special form of pail is required to carry the minnows.

In the drawings which illustrate an embodiment of the invention:

FIGURE 1 is a cross-sectional view of a portion of a boat equipped with apparatus according to the invention, and FIGURE 2 is a sectional view of the body of the apparatus.

In FIGURE 1 a body 10 having an elongated upper portion 11 and a bulbous lower portion 12 is mounted on the transom of a boat 13 by a mounting bracket 14 and a wing nut 15. A minnow pail 16 is situated inside the boat and a tube 17 is connected between the body 10 and the minnow pail 16 to conduct water from the body 10 to the pail 16. Similarly a tube 18 is connected between the pail 16 and the body 10 to conduct water from the pail 16 to the body 10. The end 19 of the tube 17 is situated over the pail and above the level of the water in the pail so that the water from the tube 19 flows freely into the pail but the tube is not in contact with the surface of the water. Thus any tendency for the water to back-siphon via the tube 17 when the boat is stopped is prevented. The end 20 of the tube 18 is situated in the pail at or slightly below the surface of the water.

FIGURE 2 shows a sectional view of the body 10. The body 10 as previously stated is provided with an elongated portion 11 and a bulbous portion 12. A first frontal opening 21 is provided in the elongated portion of the body and this opening 21 is connected via the passageway 22 to the outlet connection 23. The outlet connection 23 is coupled to the tube 17 which as shown in FIGURE 1 leads to the minnow pail 16. A second frontal opening 24 is connected to the rear outlet 25 by a passageway 26 having a constriction 27 therein. The tube 18 is connected to the connection 28 which connection in turn is connected to the passageway 26 by a passageway 29. The passageway 29 intersects the passageway 26 on the side of the constriction adjacent the rear outlet 25.

As the boat moves through the water, water enters the frontal openings 21 and 24 and is exhausted through the rear outlet 25. The water entering the frontal opening 21 passes through the passageway 22 and the tube 17 into the minnow pail 16. The water entering the frontal opening 24 passes through the passageway 26 and past the constriction 27 at which point its velocity is greatly increased and its pressure accordingly reduced. The reduced pressure adjacent the constriction 27 causes a suction in the passageway 29 which suction is transmitted via the tube 18 to the minnow pail 16. If the level in the minnow pail 16 is above the end of the tube 20 then water will be drawn up through theh tube 18 and exhausted through the passogeway 26 to the rear outlet 25. Thus the water in the minnow pail is continuously changed while the boat is in motion. The tube 18 and passageway 29 in communication therewith are preferably greater in capacity or diameter than tube 17 and passageway 22 in communication therewith, whereby water is removed from the minnow pail 16 faster than water is discharged into said minnow pail to prevent water from overflowing the upepr edge of said pail when the water in the pail is above the end of the tube 20. In a preferred embodiment of the invention tube 17 and passsageway 22 are ⅛ of an inch in diameter, tube 18 and passageway 29 are ¼ of an inch in diameter, frontal opening 24 is ¾ of an inch in diameter, constriction 27 is ⅜ of an inch in diameter and rear outlet 25 is 9/16 of an inch in diameter.

Bosses 30 are provided on the flange 31 and cooperate with corresponding bosses on the bracket 14 (not shown) and by this means the position of the body with respect to the transom of the boat may be varied and if desired the body may be moved into the position shown in dotted lines in FIGURE 1 when the apparatus will be inoperative regardless of motion of the boat.

What I claim as my invention is:

Apparatus for changing the water supply in a minnow pail comprising a body adapted to be mounted on the exterior of a boat and having an intake passage and a discharge passage having a relatively large frontal opening and a rear outlet, the intake passage having a first conduit connected thereto for supplying water to the minnow pail, said conduit having a discharge opening located above the level of water in the pail, the discharge passage including an inwardly tapered passage portion terminating in a relatively short cylindrical constricted passage portion having a shoulder forming a common border with a relatively long cylindrical passage coaxial with said rear outlet, conduit means terminating at said shoulder at one end and including another end in said pail and having an intake opening below the surface of the water therein whereby forward motion of the boat through causes water to enter the intake passage and the large frontal opening of the discharge passage and creates a positive pressure in the first conduit and a negative pressure in said conduit means thereby changing the water in said minnow pail.

References Cited in the file of this patent

UNITED STATES PATENTS

| | | |
|---|---|---|
| 2,151,225 | Newton | Mar. 21, 1939 |
| 2,485,684 | Aldredge | Oct. 25, 1949 |
| 2,672,114 | McCartney | Mar. 16, 1954 |
| 2,771,052 | Halverson | Nov. 20, 1956 |